United States Patent [19]

Crandall et al.

[11] Patent Number: 4,698,220

[45] Date of Patent: Oct. 6, 1987

[54] PARTITIONED REDUCTION PROCESS FOR FERROMAGNETIC CHROMIUM DIOXIDE

[75] Inventors: Terry G. Crandall, Wilmington, Del.; Horng-Yih Chen, Chadds Ford, Pa.

[73] Assignee: E. I. du Pont de Nemours and Company, Wilmington, Del.

[21] Appl. No.: 2,311

[22] Filed: Jan. 20, 1987

Related U.S. Application Data

[63] Continuation-in-part of Ser. No. 845,733, Mar. 28, 1986, abandoned.

[51] Int. Cl.$^4$ ............................................. C01G 37/027
[52] U.S. Cl. .................................... 423/607; 252/62.51
[58] Field of Search ....................... 252/62.51; 423/607

[56] References Cited

U.S. PATENT DOCUMENTS

| | | | |
|---|---|---|---|
| 3,278,263 | 10/1966 | Cox | 23/145 |
| 3,512,930 | 5/1970 | Bottjer et al. | 23/145 |
| 3,911,095 | 10/1975 | Montiglio et al. | 423/607 |
| 3,929,978 | 12/1975 | Morero et al. | 423/607 |
| 3,979,310 | 9/1976 | Montiglio et al. | 252/62.51 |
| 4,045,544 | 8/1977 | Williston et al. | 423/607 |

*Primary Examiner*—Jack Cooper

[57] ABSTRACT

A new process for synthesis of ferromagnetic chromium dioxide is provided wherein a chromium trioxide solution is mixed with reducing agent that only partially reacts with chromium trioxide during formation of paste below about 100° C. and completes reaction during the heating of paste to temperatures needed to synthesize ferromagnetic chromium dioxide.

14 Claims, No Drawings

PARTITIONED REDUCTION PROCESS FOR FERROMAGNETIC CHROMIUM DIOXIDE

CROSS REFERENCE TO RELATED APPLICATIONS

This application is a continuation-in-part of U.S. patent application Ser. No. 845.733 filed Mar. 28, 1986 now abandoned.

BACKGROUND OF THE INVENTION

1. Field of the Invention

This invention relates to the synthesis of ferromagnetic chromium dioxide. More particularly, this invention provides a two-stage, partitioned reduction process for synthesis of ferromagnetic chromium dioxide with certain organic reducing agents.

2. State of the Art

Ferromagnetic chromium dioxide is generally manufactured in a two-stage process. In the first stage, chromium trioxide ($CrO_3$) is dissolved in water under ambient conditions, and chromic oxide ($Cr_2O_3$) is then added to form a paste. Dopants and crystal modifiers, such as iron and antimony, may be added to achieve desired magnetic properties. In the second stage, this highly viscous paste is transferred to a reaction vessel, such as an annular can as disclosed in U.S. Pat. No. 4,054,544, where the paste is heated to an elevated temperature under pressure (e.g. 350° C. under 340 atmospheres) to prepare acicular crystals of chromium dioxide.

While this process can produce chromium dioxide with an excellent range of magnetic properties, the process is not optimum in several respects. Paste produced in the first stage contains insoluble chromic oxide particles that serve as nucleation sites for $CrO_2$ crystal growth during the second stage. The $CrO_2$ crystals that form on these insoluble particles are relatively large compared to those derived from crystal growth modifiers such as $Sb_2O_3$. The net effect is a relatively broad $CrO_2$ crystal size distribution that is undesirable for many applications.

Secondly, paste in the first stage tends to become so viscous that it is difficult to handle. The mixing step must be abbreviated to permit transfer from the mixing vessel to the reaction vessel before the paste becomes too viscous to pour. Adding more water to dilute the paste, and thereby reduce the viscosity, is not desirable since dilution adversely affects quality of derived $CrO_2$ and would have a negative effect on productivity and production capacity.

Thirdly, heat is added to the paste in a closed vessel during the second stage, to raise it to temperatures in the vicinity of 350° C. where the paste is converted to ferromagnetic chromium dioxide in a series of complex reactions. Because of its bulk, heating of the unstirred paste to reaction temperature is not only slow, but also creates thermal gradients within the paste. Differing thermal history throughout the reaction mass adversely affects uniformity of the chromium dioxide, and thus its magnetic properties.

Therefore, there is a need for an improved process for the synthesis of ferromagnetic chromium dioxide.

SUMMARY OF THE INVENTION

The present invention provides an improved process for producing ferromagnetic chromium dioxide comprising:

(a) preparing an aqueous slurry of chromium trioxide;

(b) stirring the aqueous slurry at a temperature below approximately 100° C. while adding approximately 0.2 to 0.5 equivalents of an organic reducing agent per equivalent of chromium trioxide, of which approximately 30 to 80% reacts with the chromium trioxide, to prepare paste; and (c) heating the paste under pressure to produce chromium dioxide.

That portion of the reducing agent, which does not react with chromium during preparation of the paste, reacts exothermally as the paste is heated under pressure to the reaction temperature at which chromium dioxide is formed, thereby providing a uniform internally derived source of heat that boosts temperature of the paste. Resulting chromium dioxide has a relatively narrow particle size distribution, improved friability and dispersibility, and is particularly well suited for use in audio, video and data tapes. It can also possess relatively low aspect ratio if desired.

DETAILED DESCRIPTION OF THE INVENTION

It has now been found that ferromagnetic chromium dioxide can be prepared in a relatively simple process that involves a two-stage, or partitioned, reduction of chromium trioxide with certain organic reducing agents in aqueous solution. In the first stage, the reducing agent partially reduces chromium (+6) to mixed valences that are soluble in the reaction medium, referred to herein as "paste". In the second stage, the paste is heated toward the temperature (i.e., typically 240°-350° C.) at which chromium dioxide is formed. During this second stage, remaining reducing agent reacts with chromium (+6) and intermediate chromium valences from the first stage. This reaction begins at a temperature higher than 100° C., but lower than the temperature at which chromium dioxide begins to form. Completion of the exothermic reduction provides a heat boost that is uniform throughout the paste mass, and which rapidly raises mass temperature to near the 240° C. temperature required for commencement of chromium dioxide synthesis. Reduced species of chromium produced during this stage remain in supersaturated solution.

In carrying out the process, chromium trioxide is slurried in water, during which a portion of the chromium trioxide dissolves. Although the quantity of water used can vary, it is convenient to use from 2.5 to 5 parts of chromium trioxide by weight per part of water. Larger quantities of water can be used, but offer no advantage and adversely affect productivity and production capacity unless removed in a separate step prior to the second stage of synthesis. Lesser quantities of water might be employed, but the resulting solution will be highly viscous, rendering it difficult to handle and to control the exothermic first stage reduction reaction. Typically, a weight ratio of 3.0 to 3.6 parts chromium trioxide per part water is selected.

In principle, any temperature below 100° C. can be selected for the reduction chemistry. The preferred temperature depends in part on the reducing agent that is being used, since different agents react at different rates at a given temperature. Generally, a temperature is selected that permits safe and reasonably rapid reaction. The reducing agent should always be added to the chromium trioxide slurry at a rate that does not exceed the reaction rate. Otherwise, unreacted reducing agent will accumulate and produce conditions that may lead to a run-away exothermic reaction. Agitation, typically in the form of stirring, is required to ensure efficient mixing of the sparingly soluble organic reducing agent and the aqueous phase. Agitation is also needed to dissipate local hot spots occurring at the point of addition.

Organic reducing agents that are useful will react to form gaseous products, such as carbon dioxide, that readily escape the solution, and water, thereby avoiding introduction of contaminants that would effect performance of ferromagnetic chromium dioxide. The reducing agent should be sufficiently reactive that at least approximately 30% of the agent reacts during the first reduction (i.e., paste formation) step. Otherwise, some $CrO_3$ will remain in solid form and ultimately result in a non-homogeneous product, and too much of the reduction will occur during the second stage. If more than about 80% of the reduction occurs during the first stage however, additional water will be needed to provide control over the reduction, and insufficient reducing agent will remain for consumption during the second stage.

Saturated aliphatic and cyclic compounds with a 6 to 12 hydrocarbon backbone and a polar group (e.g., ketone, alcohol, acid, ester, aldehyde or amine) that activates the carbon backbone toward oxidation by chromium trioxide may be used to advantage. Compounds containing functional groups such as mercaptans, phosphates, or sulfonates also may be employed if residues that would adversely alter magnetic properties are removed in an additional process step after synthesis. Alternatively, the backbone may contain one or more sites of unsaturation of polar functionality such that C-6 to C-12 fragments are obtained during the first stage of the reduction reaction. Particularly useful reducing agents also serve as an antifoam agent in the reaction, and include 1-octanol, 2-octanol, decanol, dodecanol, cyclohexanone, dodecylamine, octanoic acid and oleic acid.

Aromatic reducing agents that have been tested are not particularly useful. Some, such as naphthol, exhibit favorable reactivity but produce poor quality chromium dioxide. Some aliphatic and aromatic compounds are too reactive, including methanol, ethanol, formaldehyde, paraformaldehyde, t-butanol, pentanol, polyethylene glycol, toluene, and diethylene glycol dimethyl ether. Other compounds are not reactive enough, including octadecanol, stearic acid, myristic acid and decane. Other reducing agents that may be considered, and appropriate testing for their usefulness in the process, will be obvious to those skilled in the art.

The amount of reducing agent that is used is expressed in terms of reducing equivalents, where one (1) equivalent represents the amount of reducing agent that reacts with one equivalent of chromium trioxide to produce one (1) equivalent of chromic oxide. The term is further explained, as it applies to this invention, by reference to the following equation that illustrates use of a preferred reducing agent, octanol:

EQUATION 1

|  | $C_8H_{18}O$ + | $16CrO_3$ = | $8Cr_2O_3$ + | $9H_2O$ + | $8CO_2$ |
|---|---|---|---|---|---|
| mol. wt. | 130 | 100 | 152 | 18 | 44 |
| weight | 130 | 1600 | 1216 | 162 | 352 |
| eq. weight | 2.7 | 33.3 | 25.3 | — | — |
| equivalents | 48 | 48 | 48 | — | — |

In actual practice, chromium trioxide present is in excess of that destined for reduction as shown in Equation 1. The excess chromium trioxide reacts with the chromium (+3) to produce the desired paste polymer. It is convenient to express the equivalents of reducing agent relative to the total chromium trioxide employed, and thus the equivalent ratio (reducing agent to chromium trioxide) is less than 1 to 1.

Useful quantities of reducing agent range from 0.2 to 0.5 equivalents per equivalent of $CrO_3$, which corresponds to a final paste composition, after all reduction has been completed, containing 1.33 to 5 parts $CrO_3$ per part $Cr_2O_3$ by weight. Amounts of reducing agent in the range of 0.25 to 0.4 equivalents per equivalent of $CrO_3$ are preferred.

When the reducing agent and chromium trioxide are brought together in solution, a vigorous reduction reaction occurs. While temperatures as high as 100° C. may be employed when selecting a reducing agent with low volatility, there is no advantage in selecting such a temperature and lower temperatures generally are employed, especially with reducing agents that are relatively volatile and subject to spontaneous combustion at elevated temperature. Generally the temperature will be maintained below 90° C., ideally in the range of 50° to 75° C. If octanol, a preferred reducing agent, is selected, care should be exercised to prevent the temperature from exceeding approximately 80° C. since spontaneous combustion may occur at higher temperatures.

Control over the reduction reaction is exercised by external cooling and by controlling the rate at which the reducing agent is added. While the reduction reaction is initially rapid, the rate steadily decreases as the reaction proceeds. Depending on the particular reducing agent, quantities, and temperatures, the reduction reaction during this stage either stops of its own accord, or is terminated by reducing the temperature of the reaction mass, when the reduction is 30% to 80% complete, and preferably 50% to 60% complete. The percent completion can be ascertained by measuring weight loss during the reaction, with the weight loss assumed to be $CO_2$ if the reaction is conducted under reflux conditions. Time needed to conduct this first-stage reduction, and thereby from "paste", is not critical to the chemistry and is determined primarily by the heat removal capability of the cooling equipment. Typical times will be in the range of several minutes to a few hours.

In practice, where octanol is employed as the organic reducing agent for paste production, a combination of $CrO_3$, water, and optionally modifiers are mixed together at ambient temperature. Octanol is then added with stirring while the temperature is allowed to rise to about 60° C. due to the heat of reaction. After all the octanol has been added at about 60° C., the temperature is allowed to rise to 75° C. and is then held there for about 20 minutes. The paste is then cooled and stored or transferred for synthesis.

The reduction chemistry of Cr(+6) is understood from the published literature to involve stepwise reduction from Cr(+6) to Cr(+5) to Cr(+4) to Cr(+3). The first and last steps are fast: the Cr(+5) to Cr(+4) step is slow and is rate determining. This rate pattern indicates that the paste composition at a 60% completion point of the first stage reduction probably consists of Cr(+5), Cr(+3), and unreacted $CrO_3$. While the precise nature of the reduced chromium species is not known, the reduced species as formed are soluble and are quickly assimilated into the paste polymeric structure, which is believed to include water and various oxidation states of chromium. Thus, reduction does not result in particle formation, which might serve as nucleation sites during the subsequent conversion of the paste to ferromagnetic chromium dioxide.

It has been found that acetic acid, a fragment that is formed during consumption of the C6 and higher organic reducing agents in the first stage reduction, does not react to a significant extent during the first stage, but readily reacts and serves as a reducing agent at temperatures higher than approximately 110° C. Thus, it is possible to adjust the relative percentage of the reduction that occurs in the first and second stages of the partitioned process by substituting acetic acid for a portion of the C6 and higher organic reducing agents. It may be advantageous, for example, to shift the reduction toward the second stage to minimize the amount of heat removed in the first stage, to decrease paste viscosity in the first stage product, or to increase the heat kick obtained in the second stage reduction.

No practical advantage is achieved by substituting acetic acid for more than 40% of the reducing equivalents provided by the C6 or higher organic reducing agent. Greater levels of substitution generally will not be desirable since too little of the reduction will occur during the first stage. Useful results normally will be obtained when acetic acid provides approximately 10 to 25% of the combined reducing equivalents. Since acetic acid provides some of the reducing effect, the amount of C6 or higher reducing agent added to the first stage reduction may be as low as 0.12 equivalents, provided the total equivalents remain in the range of approximately 0.2 to 0.5.

While acetic acid is particularly useful in adjusting the relative percentage of the reduction that takes place in the first and second stage, other equivalent additives that may be used along or in conjunction with acetic acid will be apparent to those skilled in the art. For example, other C2 to C5 primary organic acids can be selected, but tend to become more reactive during the first stage reduction with increasing molecular weight, and thus do not defer their full reducing power to the second stage reduction.

Paste from the first stage reduction is then charged to a reactor, where it is heated under pressure. As the paste reaches a temperature of approximately 130° C. to 140° C., the remainder of the organic reducing agent reacts with chromium trioxide, liberating heat uniformly throughout the paste and boosting the temperature toward 240° C. where chromium dioxide begins to be synthesized. Sufficient heat may be generated during this second stage reduction to replace most of the external heat normally employed to bring the paste to the chromium dioxide synthesis temperature. Importantly, reduced chromium species that are formed as the reduction goes to completion remain completely in solution, even though the paste is at the solubility limit with respect to polymer before this phase of the reduction begins. Thus, a supersaturated condition exists which is not obtainable when starting from particulate $Cr_2O_3$ according to the known prior art.

Complete solution of all chrome species is a unique advantage of the present process. It provides for uniform distribution of ingredients through the paste volume at a resolution approaching molecular dimensions. In combination with similar distribution of additives, as taught in U.S. Pat. No. 4,340,494, and in combination with the reduced temperature gradient in the paste due to the uniform release of heat energy throughout the paste during the synthesis phase of reduction, conditions exist that are more favorable for uniform crystal growth and distribution than is obtainable by practicing the prior art. The narrower particle size distribution is evident in electron photomicrographs and may be confirmed indirectly. For example, the peak coercivity in a plot of coercivity versus surface area occurs at 37 $m^2/g$, whereas the coercivity peak for chromium dioxide made by the prior art using particulate $Cr_2O_3$ and additives occurs at about 30 $m_2/g$. This is strong evidence that the small side tail of the distribution, which is responsible for the decline in coercivity at high surface area, is reduced in size when practicing the process.

After the second stage reduction, the paste is converted to ferromagnetic chromium dioxide by heating to temperatures in the range of 300° to 400°, under a pressure of approximately 300 to 400 atmospheres, as is conventional in the art. Use of an annular can and reaction conditions described in U.S. Pat. No. 4,054,544, incorporated herein by reference, can be used to advantage.

Conventional nucleation agents, such as antimony oxide and tellurium oxide (U.S. Pat. Nos. 2,923,683 and 3,243,260), generally will be added during preparation of the paste along with iron dopant (U.S. Pat. No. 3,034,988). It is particularly advantageous to add these modifiers as a solution in aqueous chromium troxide, as described in U.S. Pat. No. 4,524,008. Useful quantities of crystal growth modifier range from 0.025% to 2.5% based on the weight of $CrO_3$. Typical quantities for paste formulations with low ratios of Cr(+6) to Cr(+3) will be 0.025% to 0.5%, and 0.5% to 2.5% where high ratios of Cr(+6) to Cr(+3) are targeted. Efficiency of the nucleation seed decreases as the Cr(+6) to Cr(+3) ratio increases. Without being bound by theory, it is believed that some of the advantages of the invention are due to the minimizing of seed crystal formation other than those intentionally formed by the nucleating agent. Thus, a more homogeneous product is formed.

It has been found that the aspect ratio of ferromagnetic chromium dioxide obtained from the process is a direct function of the ratio of soluble Cr(+6) to soluble Cr(+3) in the paste, and can be varied from approximately 10 or 12, to 6. Thus, the aspect ratio can be varied from that of the prior art, to approximately half of the prior art values. Low aspect ratio particles are readily obtained by employing a low ratio of Cr(+6) to Cr(+3) in the paste, which corresponds to a high degree of overall reduction. These low soluble ratios require supersaturated concentrations that are not attainable through the prior art. Chromium dioxide product containing low aspect ratio particles is notably friable, requiring less force to break up, has improved dispersibility in binder, and affords superior magnetic properties in audio, video, and data tape.

Particles produced according to the partitioned reduction process of the present invention can be further upgraded and stabilized by techniques known in the art. A variety of known binders, surfactants, antistatic agents, plasticizers, hardeners, etc. can be employed when the particles are used to produce magnetic recording elements such as audio and video tapes and data disks and tapes. Pertinent prior art patents include U.S. Pat. Nos. 3,529,930; 3,512,930; 4,045,544; 3,080,319; 3,558,492; 3,468,700; 3,397,072; 3,585,141; 3,926,826; 3,929,658; 3,929,659; 3,278,263 and 3,649,541.

While the process has been described using $CrO_3$ as the source of hexavalent chromium, it will be apparent to those skilled in the art that other sources could be used. For example, it is contemplated that chromium salts such as sodium dichromate, when acidified with a strong acid such as sulfuric acid, could be employed in the production of paste in accordance with the invention.

The following examples serve to illustrate the practice of the present invention and beneficial results obtained during the process and improvements with the particles produced by the process.

EXAMPLE 1

A stock solution was prepared as described in Chen U.S. Pat. No. 4,524,008 by boiling under reflux 35 kg of antimony trioxide, 354 kg chromic acid and 212 kg water at approximately 120° C. for 3 hours. Aliquot parts of this solution served to provide antimony modifier in paste preparations.

Chromic acid (133.4 kg.) distilled water (39.0 kg). antimony stock solution (2735 g = 158.9 g 100% $sb_2O_3$), and magnetite (1703 g) were charged to a 150 liter carbon steel mix can. The mixture was placed on a Cowles Dissolver equipped with two 23 cm mixing blades set 7.6 cm apart on the shaft. The mixer was powered by a 25 hp motor. Mix speed was adjusted to 700 rpm and octanol (3659 g) was added gradually over 2.5 hours with external water cooling as needed to keep the temperature at 50° to 60° C. The temperature was then allowed to rise to 75° to 80° C. and was held there for one hour. The resulting paste was cooled to about 50° C. with stirring and set aside to cool to room temperature.

The paste was reacted as described in Cox et al., U.S. Pat. No. 3,278,263 in an annular can as described in Williston et al. U.S. Pat. No. 4,045,544, at 350° C. and 340 atmospheres. Total heat cycle was 12 hours, about 8 of which was at temperature. The chromium dioxide produced was upgraded and stabilized as described in U.S. Pat. Nos. 3,529,930 and 3,512,930.

To measure heat of reaction for unreacted octanol within the paste a thermocouple was placed in a can to monitor paste temperature during the heat cycle. A rapid exotherm was observed which started at 140° C. and ended 15 minutes later at about 245° C. The total temperature rise of 105° C. agreed well with previous laboratory results of 112° C. This exotherm contribute to productivity by shortening the heatup portion of the reaction cycle and as previously mentioned is believed to contribute to the improved properties observed with chromium dioxide particles produced by this process.

The particles were used to prepare audio, data and video tapes for comparison with control material produced by the prior art method of combining a mixture of $CrO_3$ and $Cr_2O_3$ to prepare the paste.

The particles had the properties shown in Table 1.

TABLE 1

|  | iHc | $\sigma s$ emu/q | $\sigma r$ emu/q | ssa $m^2$/q | L/D |
|---|---|---|---|---|---|
| Control | 539 | 74.5 | 36.2 | 35.7 | 10.0 |
| Invention | 544 | 70.0 | 32.8 | 35.3 | 7.0 |

Testing revealed that fully equivalent electromagnetic results were obtained during data tape and video tape runs, but particles made according to the present invention produced a lower noise and higher high frequency output in audio tape. The particles were easier to disperse for all tape formulations tested than control particles.

EXAMPLE 2

General Laboratory Procedure

Chromic acid (476.2 g, 14.29 equiv.), water (95 g minimum), and antimony trioxide (from 0.025% to 2.5%, based on the weight of chromic acid) were added to a one liter beaker and stirred in a Cowles laboratory mixer suited for mixing highly viscous pastes. The antimony trioxide was added as a solution in concentrated chromic acid, prepared as described in Chen U.S. Pat. No. 4,524,008 and in Example 1. Iron oxide was also added to enhance the coercivity of the resulting chromium dioxide. A suitable organic reducing agent (from 2.97 to 7.10 equivalents) was added gradually over 20° to 40 minutes at 50° to 70° C. Temperature control was achieved with the aid of a water bath. After all of the reducing agent had been added, the temperature was allowed to rise to 75° to 80° C. and held there for 20 to 30 additional minutes. The resulting viscous paste was cooled to ambient temperature, transferred to a glass jar lined with a sheet of Teflon ® film and the Teflon ® pigtails were wired shut.

The paste thus prepared was converted to chromium dioxide in a commercial scale reactor at 350° C. and 340° atmospheres over 12 hours. The reactor was prepressurized with nitrogen or air to one fifth of the reaction pressure, the remaining pressure being derived primarily from oxygen generated during the course of the conversion. The resulting crude clinker (aggregated chromium dioxide particles) was dried and micropulverized to afford 400 g (theory) of chromium dioxide.

EXAMPLE 3

Effective Organic Reducing Agents

Following the procedure of Example 2 numerous organic compounds were tested for effectiveness in partial reduction of chromic acid and desired antifoam activity. The following compounds were found to be neither too reactive nor too inactive and to prevent excessive foaming action due to carbon dioxide gas during the paste production and also to provide partitioning of reduction between paste and synthesis; 1-octanol, 2 -octanol, decanol, dodecanol, cyclohexanone, dodecylamine, octanoic acid and oleic acid.

EXAMPLE 4

Reaction Exotherms

A sample of paste made according to the procedure of Example 2 and using the composition of Example 1 was subjected to testing for exothermic reaction using an accelerating rate calorimeter (ARC). Two back to back exotherms were observed which produced a combined temperature increase of 112° C.

EXAMPLE 5

Low Aspect Ratio Procedure

A mixture was prepared consisting of 470 g chromic acid, 137 g water, 10.33 g antimony stock solution and 6.0 g magnetite. Total $CrO_3$ content was 476.2 g (14.29 equiv.). Antimony trioxide content was 0.6 g (0.125% by weight based on total $CrO_3$). Magnetite content was 1.25 percent based on total $CrO_3$. This mixture was stirred in a one liter beaker using a Cowles Model 12 Laboratory Dissolver which was gradually increased in speed up to 1800 rpm. A loose fitting lid was provided for the beaker to minimize loss of water due to evaporation. Octanol (12.89 g, 4.76 equiv.) was added gradually by pipette starting with the mixture at 25° C. over a period of 30 minutes. The temperature rose quickly to 50° to 60° C., where it was maintained with water bath cooling until all of the octanol had been added. The temperature was then allowed to rise to 75° to 80° C. and held there for another 20 minutes. The resulting viscous paste was cooled to ambient temperature and reacted as in Example 2.

The particles had a coercivity of 558 Oersteds, $\sigma s$ of 77.4 emu/g. $\sigma r$ of 38.7 emu/g specific surface area of 39.6 $m^2/g$ and a length to diameter ratio (L/D) of 6.4. While these magnetic properties compare favorably with chromium dioxide produced by prior art methods of mixing together $Cr(+6)$ and $Cr(+3)$ oxides to prepare a paste, the L/D for the prior art particles is about 10.0.

A series of low aspect ratio chromium dioxide particles was similarly prepared with L/D ratios of from 6.4 to 8.8 in which chromic acid was partially reduced to provide a final $Cr(+6)$ to $Cr(+3)$ weight ratio in the paste of from 2.4 to 3.6 when expressed as $CrO_3$ to $Cr_2O_3$.

Audio tapes produced with the low aspect ratio particles demonstrated low noise and excellent response over a wide range of frequencies. Video and data tapes were produced which were fully equivalent to the best commerically available tapes.

EXAMPLE 6

High Aspect Ratio Preparation

Paste was prepared as in Example 5, except that the water level was 141 g and 9.95 g (3.67 equiv.) of octanol was used. This gave a final $CrO_3$ to $Cr_2O_3$ ratio of 3.8 and produced particles with a L/D ratio of 9.8 which is equivalent to prior art practices. Audio tape tests showed that these particles were fully equivalent to high aspect ratio particles produced by prior art techniques.

EXAMPLE 7

Oleic Acid Preparation

Paste was prepared as in Example 2. except that the water level was 140 g. antimony stock solution was 6.89 g, magnetic was 2.0 g and oleic acid (13.2 g, 4.76 equiv.) was used a reducing agent. The particles gave a coercivity of 518 Oersted, $\sigma s$ 70.2 emu/g, $\sigma r$ of 33.1 emu/g, ssa of 33.5 $m^2/g$ and L/D of 6.5.

EXAMPLE 8

Dodecylamine Preparation

Paste was prepared as in Example 7 except that dodecylamine (11.15 g, 4.76 equiv.) was used as the reducing agent. The particles gave a coercivity of 533 Oersteds, $\sigma s$ of 69.5 emu/g, $\sigma r$ of 32.4 emu/g, ssa of 35.3 $m^2/g$ and L/D of 7.5.

EXAMPLE 9

Cyclohexanone Preparation

Paste was prepared as in Example 7 except that the water level was 165 g and cyclohexanone (14.6 g, 4.76 equiv.) was used as the reducing agent. The particles gave a coercivity of 511 Oersteds, $\sigma s$ of 73.6 emu/g, $\sigma r$ of 33.8 emu/g, ssa of 31.3 $m^2/g$ and L/D of 7.4.

EXAMPLE 10

Safety Considerations

A mixture of 454 g $CrO_3$ and 137 g water was mixed and stirred. Ethylene glycol was added to the mixture at 30° to 50° C. Flames like small candles were observed over the surface as the liquids made contact as a result of the highly exothermic reaction. An unknown amount was consumed by this addition with the possible danger of fire spreading to the container from which the liquid was being poured. Similar flame was observed when diethyleneglycol dimethylether was added to $CrO_3$ and water at 50° to 60° C. Octanol reductions produced smoke but no flame during additions made at temperatures above 70° C.

EXAMPLE 11

Sodium Dichromate Procedure

A sample of commercially available sodium dichromate dihydrate 85 percent liquor was stirred in a 1 liter flask while adding 246.5 g 96 percent $H_2SO_4$ (236.6 g 100 percent, 1.21 equiv.). External cooling was provided as needed to keep the temperature below 50° C. Antimony trioxide stock solution (6.88 g. 0.40 g 100 percent $Sb_2O_3$, 0.065 percent based on weight of 100 percent $Na_2Cr_2O_7$), prepared as described in Example 1, was added along with 2 g (0.32 percent based on weight of 100 percent $Na_2Cr_2O_7$) magnetite. Stirring was continued and octanol (12.89 g, 4.76 equiv.) was added over 30 minutes. Cooling was provided as needed to maintain the temperature between 60° and 70° C. After addition of all the octanol, the temperature was allowed to increase to 105° C. (reflux). Stirring at reflux was continued overnight, although based on $CO_2$ release and viscosity the reduction had reached the partial and point of ca. 60 percent within the first hour. The finished paste was not carried through the synthesis cycle. The reactivity of the system toward the reducing agent and the final physical properties of the paste were sufficient confirmation that the overall paste process was the same as with reductions involving the use of $CrO_3$.

EXAMPLE 12

Octanol/Acetic Acid Preparation

A mixture was prepared consisting of 704.3 g chromic acid, 163.4 g water, 16.52 g antimony stock solution, and 15 g magnetite. Total $CrO_3$ content was 714 g (21.44 equiv.). Antimony trioxide content was 0.96 g (0.134% by weight based on total $CrO_3$). Magnetite content was 2.1% based on total $CrO_3$. This mixture was stirred in a one liter beaker using a Cowles Model 12 Laboratory Dissolver which was gradually increased in speed up to 1800 rpm. A loose fitting lid was provided for the beaker to minimize loss of water due to evaporation. A mixture of 1-octanol (12.21 g: 4.52 equiv.: equal to 85% of the total reducing equivalents) and glacial acetic acid (5.96 g. 0.80 equiv.: equal to 15% of the total reducing equivalents) was added gradually by pipette starting with the mixture at 25° C. over a period of 30 minutes. The temperature rose quickly to 50° to 60° C., where it was maintained with water bath cooling until all of the mixture had been added. The temperature was then allowed to rise to 75 to 80° C. and held there for another 20 minutes. The resulting viscous paste was cooled to ambient temperature and reacted as in Example 2. The dried and ground particles had the powder properties shown below in Table 2.

EXAMPLE 13

The procedure of Example 12 was repeated except that the reducing mixture consisted of 10.77 g 1-octanol (3.99 equiv.; equal to 75% of the total reducing equivalents) and 9.94 g glacial acetic acid (1.33 equiv.; equal to 25% of the total reducing equivalents). The product had the powder properties shown below in Table 2.

EXAMPLE 14

The procedure of Example 12 was repeated except that the reducing agent consisted only of 1-octanol (14.36 g, 5.32 equiv.). This sample was prepared as a control for Examples 12 and 13. The product had the powder properties shown below in Table 2.

TABLE 2

|  | iHc Oersteds | $\sigma s$ emu/q | $\sigma r$ emu/q | ssa $m^2/q$ |
| --- | --- | --- | --- | --- |
| Example 12 | 653 | 70.0 | 35.5 | 38.0 |
| Example 13 | 659 | 70.5 | 35.5 | 38.5 |
| Example 14 | 658 | 72.0 | 36.0 | 31.5 |

We claim:

1. A process for producing ferromagnetic chromium dioxide comprising:
   (a) adding chromium trioxide in water to form a slurry containing approximately 2.5 to 5 parts of chromium trioxide per part of water by weight;
   (b) adding to said slurry approximately 0.2 to 0.5 equivalents of an organic reducing agent per equivalent of chromium trioxide, said organic reducin agent, having a carbon backbone of at least C6 and maintaining the temperature below approximately 90° C. while agitating the slurry until 30% to 80% of the organic reducing agent reacts with and reduces $Cr^{+6}$ in the chromium trioxide to form a paste containing mixed intermediate chromium valences that are soluble therein;
   (c) heating the paste to a temperature above approximately 110° C. but below a temperature at which chromium dioxide begins to form, at which temperature the remaining reducing agent from step (b) reacts with $Cr^{+6}$ in the chromium trioxide and the mixed intermediate valences produced in (b): and
   (d) further heating the paste to a temperature of approximately 300° C. to 400° C. under a pressure of approximately 300 to 400 atmospheres to form ferromagnetic chromium dioxide.

2. The process of claim 1 wherein the weight ratio of chromium trioxide to water forming said slurry is in the range of 3.0-3.6 to 1. by weight.

3. The process of claim 1 wherein the organic reducing agent has a C6 to C12 backbone and a polar group selected from the group consisting of ketone, alcohol, acid, and amine.

4. The process of claim 3 wherein the reducing agent also functions as an antifoaming agent.

5. The process of claim 3 wherein the reducing agent is selected from the group consisting of 1-octanol, 2-octanol, decanol, dodecanol, cyclohexanone, dodecylamine, octanoic acid and oleic acid.

6. The process of claim 5 wherein said reducing agent is added in the ratio of 0.25 to 0.4 equivalents per equivalent of $CrO_3$.

7. The process of claim 6 wherein the temperature of said slurry of step (b) is maintained in the range of 50° to 80° C. during the formation of paste.

8. The process of claim 7 wherein the reducing agent is octanol.

9. The process of claim 1 wherein ferromagnetic chromium dioxide with a desired aspect ratio in the range of 6 to 12 is obtained.

10. The process of claim 9 wherein the reducing agent is octanol.

11. A process for producing ferromagnetic chromium dioxide comprising:
   (a) adding chromium trioxide in water to form a slurry containing approximately 2.5 to 5 parts of chromium trioxide per part of water by weight:
   (b) adding to said slurry approximately 0.2 to 0.5 equivalents of organic reducing agent per equivalent of chromium trioxide, of which reducing agent
      (i) up to 40% is a $C_2$ to $C_5$ primary organic acid, and
      (ii) the remainder has a carbon backbone of at least $C_6$ and maintaining the temperature below approximately 90° C. while agitating the slurry until 30% to 80% of the organic reducing agent reacts with and reduces $Cr^{+6}$ in the chromium trioxide to form a paste containing mixed intermediate chromium valences that are soluble therein;
   (c) heating the paste to a temperature above approximately 110° C. but below a temperature at which chromium dioxide begins to form, at which temperature the remaining reducing agent from step (b) reacts with $Cr^{+6}$ in the chromium trioxide and the mixed intermediate valences produced in (b); and
   (d) further heating the paste to a temperature of approximately 300° C. to 400° C. under a pressure of approximately 300 to 400 atmospheres to form ferromagnetic chromium dioxide.

12. The process of claim 11 wherein the primary organic acid is acetic acid.

13. The process of claim 12 wherein acetic acid provides approximately 10 to 25% of the combined reducing equivalents.

14. The process of claim 13 wherein the organic reducing agent having a carbon backbone of at least C6 is octanol.

* * * * *